US010136257B2

(12) United States Patent
Laursen et al.

(10) Patent No.: US 10,136,257 B2
(45) Date of Patent: Nov. 20, 2018

(54) MOBILE DEVICE IN-MOTION PROXIMITY GUIDANCE SYSTEM

(71) Applicant: T-Mobile USA, Inc., Bellevue, WA (US)

(72) Inventors: Damon Gene Laursen, Mukilteo, WA (US); Eric W. Yocam, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/604,316

(22) Filed: May 24, 2017

(65) Prior Publication Data
US 2017/0318424 A1 Nov. 2, 2017

Related U.S. Application Data

(63) Continuation of application No. 15/140,705, filed on Apr. 28, 2016, now Pat. No. 9,674,664.

(51) Int. Cl.
*H04M 1/725* (2006.01)
*H04W 4/02* (2018.01)
(Continued)

(52) U.S. Cl.
CPC ............ *H04W 4/023* (2013.01); *H04L 41/22* (2013.01); *H04W 4/027* (2013.01); *H04W 4/046* (2013.01); *H04W 68/005* (2013.01); *H04W 88/02* (2013.01)

(58) Field of Classification Search
CPC ......... H04M 2250/12; H04M 1/72527; H04M 1/72572; H04M 1/72569; H04W 4/023;
(Continued)

(56) References Cited

U.S. PATENT DOCUMENTS 6,590,495 B1 * 7/2003 Behbehani ............. B60Q 1/525
340/435
6,853,906 B1   2/2005 Michi et al.
(Continued)

FOREIGN PATENT DOCUMENTS

CN 102320280 A * 1/2012
GB 1355115 A * 6/1974 ......... G01S 13/9307
(Continued)

OTHER PUBLICATIONS

Office action for U.S. Appl. No. 15/140,705, dated Oct. 3, 2016, Laursen et al., "Mobile Device in-Motion Proximity Guidance System", 31 pages.
(Continued)

*Primary Examiner* — Mahendra Patel
(74) *Attorney, Agent, or Firm* — Lee & Hayes, PLLC

(57) ABSTRACT

This disclosure describes an in-motion proximity guidance system that may alert a mobile device user of a likelihood that a projected pathway of an in-motion mobile device will intersect with a projected pathway of another in-motion mobile device or a location of a stationary object. The in-motion proximity guidance may further trigger visual and/or audible alerts to indicate an imminent collision. These alerts may be emitted from the in-motion mobile devices or stationary sensor devices physically coupled to stationary objects. Further, the in-motion proximity guidance system may transmit a corrective action to a collision avoidance system of a vehicle that is communicatively coupled to a mobile device in order to reduce a likelihood of an imminent collision. The in-motion proximity guidance system may also interact with a smart traffic light system, such that a sequence of traffic light indications may be altered to avoid an imminent collision between vehicles.

16 Claims, 10 Drawing Sheets

(51) Int. Cl.
*H04W 4/04* (2009.01)
*H04W 68/00* (2009.01)
*H04L 12/24* (2006.01)
*H04W 88/02* (2009.01)

(58) Field of Classification Search
CPC . H04L 67/22; G01S 19/40; G01S 2013/9325; G01S 13/9307; B62D 12/02; B62D 12/00; B60W 30/14; G08G 1/09626; G08G 1/096833; G08G 1/16; G01C 21/3658; G06F 3/0362; G06F 3/0482
USPC .......................... 455/412.2; 345/473; 701/15
See application file for complete search history.

(56) References Cited

U.S. PATENT DOCUMENTS

| | | | |
|---|---|---|---|
| 7,035,735 B2 | 4/2006 | Knoop et al. | |
| 7,388,475 B2 | 6/2008 | Litkouhi | |
| 8,165,796 B2 | 4/2012 | Hoetzer | |
| 8,447,472 B2 | 5/2013 | Joh et al. | |
| 8,788,176 B1 * | 7/2014 | Yopp | B60W 30/095 701/300 |
| 9,043,077 B2 | 5/2015 | Doerr et al. | |
| 2005/0012602 A1 * | 1/2005 | Knoop | B60Q 9/008 340/435 |
| 2007/0282530 A1 * | 12/2007 | Meister | B60K 31/0008 701/301 |
| 2008/0023254 A1 | 1/2008 | Prost-Fin et al. | |
| 2010/0020170 A1 | 1/2010 | Higgins-Luthman et al. | |
| 2010/0030426 A1 * | 2/2010 | Okita | B60T 7/22 701/41 |
| 2010/0152972 A1 * | 6/2010 | Attard | B62D 15/027 701/42 |
| 2010/0256835 A1 | 10/2010 | Mudalige | |
| 2010/0268432 A1 * | 10/2010 | Arai | B60W 30/17 701/96 |
| 2014/0131977 A1 | 5/2014 | Yamashiro | |
| 2015/0046054 A1 | 2/2015 | Takahashi et al. | |
| 2015/0066329 A1 * | 3/2015 | Mielenz | B60W 30/143 701/93 |
| 2015/0175161 A1 * | 6/2015 | Breed | B60W 30/09 348/148 |
| 2015/0198457 A1 * | 7/2015 | Nagy | G08G 1/09626 701/431 |
| 2015/0262487 A1 * | 9/2015 | Cazanas | G08G 1/166 701/301 |
| 2016/0023599 A1 | 1/2016 | Jo | |
| 2016/0231746 A1 * | 8/2016 | Hazelton | G05D 1/0212 |
| 2016/0347249 A1 * | 12/2016 | Yamada | B60Q 9/008 |

FOREIGN PATENT DOCUMENTS

| | | | |
|---|---|---|---|
| KR | 20140089685 | 7/2004 | |
| KR | 20140058211 | 5/2014 | |
| KR | 20150011282 | 1/2015 | |
| WO | WO2009141019 | 11/2009 | |
| WO | WO 2009141019 A1 * | 11/2009 | G01S 7/539 |

OTHER PUBLICATIONS

PCT Search Report and Written Opinion dated Jul. 28, 2017 for PCT application No. PCT/US2017/028144, 15 pages.

* cited by examiner

MOBILE DEVICE IN-MOTION PROXIMITY GUIDANCE SYSTEM

CROSS REFERENCE TO RELATED APPLICATIONS

This is a continuation application which claims priority to commonly assigned, co-pending U.S. patent application Ser. No. 15/140,705, filed Apr. 28, 2016, application Ser. No. 15/140,705 is fully incorporated herein by reference.

BACKGROUND

Presently, conventional collision protection systems provide warnings for objects detected in the rear of a vehicle when the vehicle is reversing. Other conventional systems provide an indication of the distance to an object when the vehicle is travelling at a high velocity such as provided in an adaptive cruise control system. However, conventional collision protection systems may not be able to detect a potential collision at low speeds and based on a projected forward path of travel.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes techniques that implement an in-motion proximity guidance system that may alert a mobile device user of a likelihood that a projected pathway of an in-motion mobile device will intersect with a projected pathway of another in-motion mobile device or a location of a stationary object. The in-motion proximity guidance may further trigger visual and/or audible alerts to indicate an imminent collision. These alerts may be emitted from the in-motion mobile devices or stationary sensor devices physically coupled to stationary objects. Further, the in-motion proximity guidance system may transmit a corrective action to a collision avoidance system of a vehicle that is communicatively coupled to a mobile device in order to reduce a likelihood of an imminent collision. The in-motion proximity guidance system may also interact with a smart traffic light system, such that a sequence of traffic light indications may be altered to avoid an imminent collision between vehicles.

The term 'techniques,' as described herein, may refer to system(s), method(s), computer-readable instructions, module(s), algorithms, hardware logic, and/or operation(s) as permitted by the context described above and throughout the document.

Figure 1:
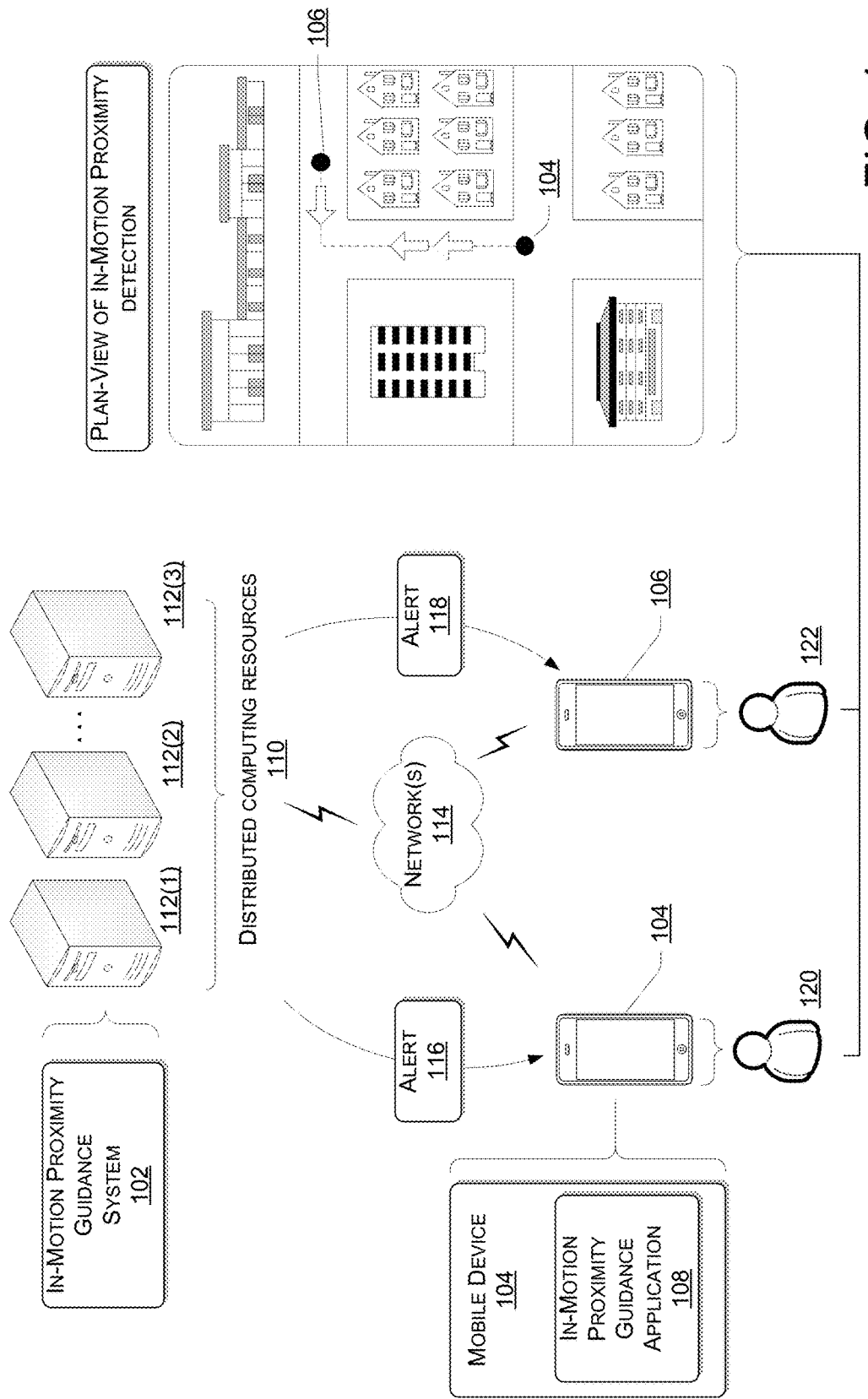
FIG. 1 is a block diagram that shows an example environment in which the in-motion proximity guidance system may detect an imminent collision between in-motion mobile devices.

FIG. 1 is a block diagram that shows an example environment in which the in-motion proximity guidance system 102 may detect an imminent collision between mobile device(s) 104 and 106. In various examples, mobile device(s) 104 and 106 may be any sort of telecommunication device, such as a cellular phone, a smart phone, a tablet computer, an electronic reader device, a media player, a gaming device, a personal computer (PC), a laptop computer, etc. Such a mobile device may be a mobile telecommunication device that is capable of being moved from one location to another location, and used in a plurality of locations. Mobile device(s) 104 and 106 may have a subscriber identity module (SIM), such as an eSIM, to identify the mobile device (s)104 and 106 to the telecommunication service provider network.

In the illustrated example, the mobile device(s) 104 and 106 may include an in-motion proximity guidance application 108 to receive, process, and transmit sensor data from the mobile device(s) 104 and 106 to the in-motion proximity guidance system 102. In various examples, the in-motion proximity guidance system 102 may operate on one or more distributed computing resource(s) 110. In various examples, the distributed computing resource(s) 110 may include one or more computing device(s) 112 that operate in a cluster or other configuration to share resources, balance load, increase performance, provide fail-over support or redundancy, or for other purposes.

In various examples, the one or more computing device(s) 112 can include one or more interfaces to enable communications with other networked devices, such as mobile device(s) 104 and 106, via one or more network(s) 114. For example, the one or more network(s) 114 can include public networks such as the Internet, private networks such as an institutional and/or personal intranet, or some combination of private and public networks. The one or more network(s) 114 can also include any type of wired and/or wireless network, including but not limited to local area network (LANs), wide area networks (WANs), satellite networks, cable networks, Wi-Fi networks, WiMax networks, mobile communications networks (e.g., 3G, 4G, and so forth) or any combination thereof. The one or more network(s) 114 can utilize communications protocols, including packet-based and/or datagram-based protocols such as internet protocol (IP), transmission control protocol (TCP), user datagram protocol (UDP), or other types of protocols. Moreover, the one or more network(s) 114 can also include a number of devices that facilitate network communications and/or form a hardware basis for the networks, such as switches, routers, gateways, access points, firewalls, base stations, repeaters, backbone devices, and the like. In some examples, the one or more network(s) 114 can further include devices that enable connection to a wireless network, such as a wireless access point (WAP). Example examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

FIG. 1 further illustrates a plan view of in-motion proximity detection along streets between mobile device(s) 104 and 106. The in-motion proximity guidance system 102 may monitor and alert the mobile device(s) 104 and 106 of an impending collision provided the mobile device(s) 104 and 106 are registered with the in-motion proximity guidance system 102. In some examples, mobile device(s) 104 and 106 may register with the in-motion proximity guidance system 102 by subscribing to a telecommunications network service that offers the service. In other examples, mobile devices may separately register with the in-motion proximity guidance system 102.

In the illustrated example, sensor data received from mobile device(s) 104 and 106 may be processed by the in-motion proximity guidance system 102 or the in-motion proximity guidance application 108 to determine a location and velocity of mobile device(s) 104 and 106. Projected pathways for mobile devices 104 and 106 can be determined based on the processed sensor data, and an overlay of the projected pathways may further indicate that the pathways of mobile device(s) 104 and 106 are likely to intersect at a given point in time. In response to identifying a likely intersection of projected pathways, the in-motion proximity guidance system 102 may transmit an alert 116 and 118 to mobile device(s) 104 and 106 respectively. The alert 116 and 118 is intended to notify respective users 120 and 122 of an imminent collision. The alert 116 and 118 may correspond to a visual indication that appears on a user interface of mobile device(s) 104 and 106 respectively. Alternatively, or additionally, the alert 116 and 118 may correspond to an audible alert that can be transmitted through a speaker of the mobile device(s) 104 and 106, or a haptic alert that can be transmitted through vibration of the mobile device(s) 104 and 106.

Figure 2:
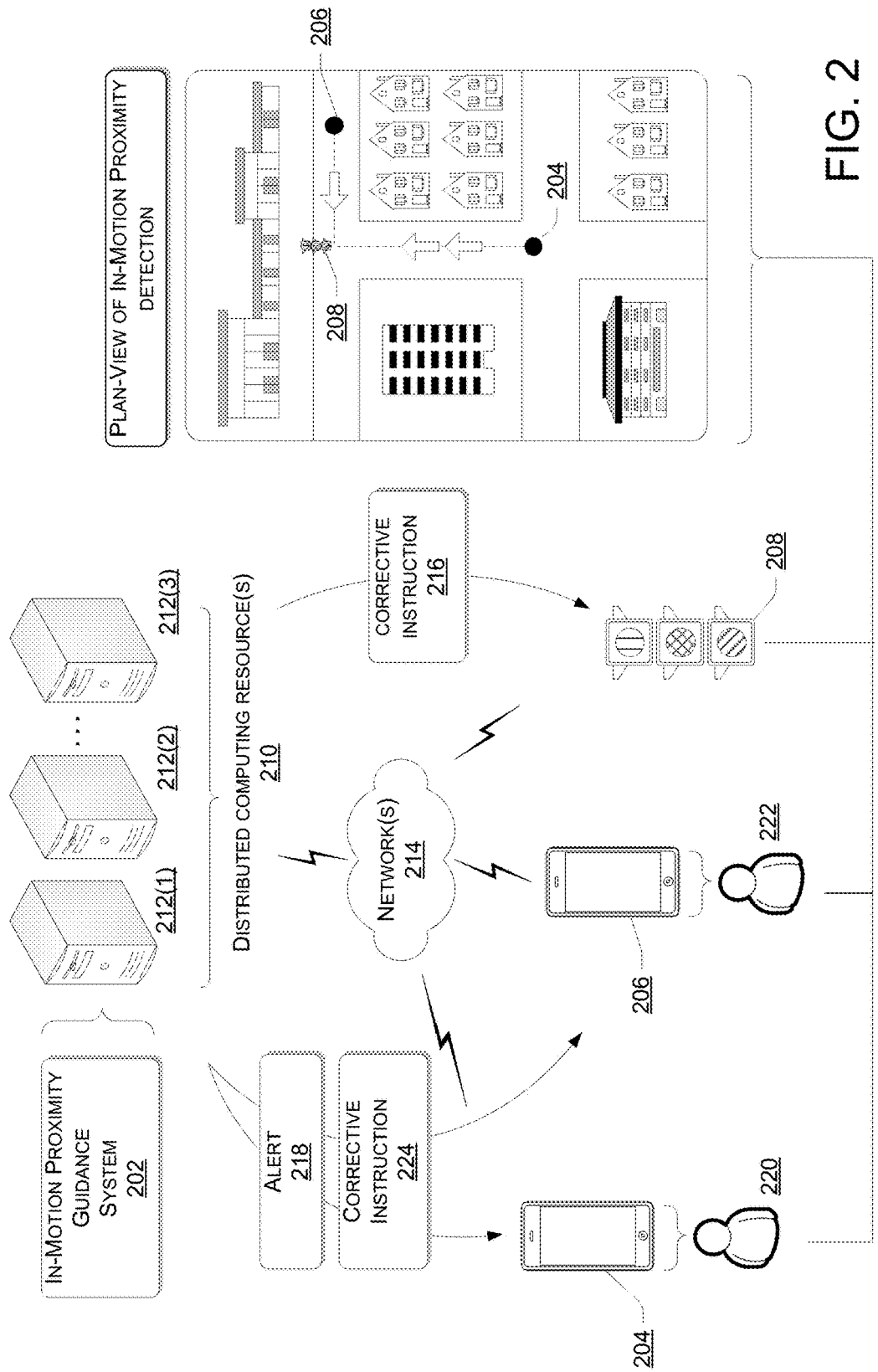
FIG. 2 is a block diagram that shows an example environment in which the in-motion proximity guidance system may detect an imminent collision between in-motion mobile devices via a smart traffic light system.

FIG. 2 is a block diagram that shows an example environment in which the in-motion proximity guidance system 202 may detect an imminent collision between mobile device(s) 204 and 206 via a smart traffic light system 208. In the illustrated example, the mobile device(s) 204 and 206 may correspond to mobile device(s) 104 and 106. Further, the in-motion proximity guidance system 202 may correspond to the in-motion proximity guidance system 102. In various examples, the in-motion proximity guidance system 202 may operate on one or more distributed computing resource(s) 210. The one or more distributed computing resource(s) 210 may correspond to the one or more distributed computing resource(s) 110. In various examples, the distributed computing resource(s) 210 may include one or more computing device(s) 212. The one or more computing device(s) 212 may correspond to the one or more computing device(s) 112.

In various examples, the one or more computing device(s) 212 can include one or more interfaces to enable communications with other networked devices, such as mobile device(s) 204 and 206, and the smart traffic light system 208, via one or more network(s) 214. The one or more network(s) may correspond to the one or more network(s) 114.

FIG. 2 further illustrates a plan view of in-motion proximity detection along streets between mobile device(s) 204 and 206, via a smart traffic light system 208. In one non-limiting example, the smart traffic light system 208 may determine a location and velocity of mobile device(s) 204 and 206 while each mobile device approaches the intersection. In doing so, the smart traffic light system 208 may transmit the sensor data to the in-motion proximity guidance system 202. The in-motion proximity guidance system 202 may determine a projected pathway for mobile device(s) 204 and 206 based on the sensor data, and over lay the project pathways to determine whether the pathways are likely to intersect at a given point in time. In response to identifying a likely intersection of projected pathways, the in-motion proximity guidance system 202 may transmit a corrective instruction 216 to the smart traffic light system 208 to alter a sequence of traffic light indications in order to reduce, if not eliminate, a likelihood of a collision between mobile device(s) 204 and 206.

In some examples, mobile device(s) 204 and 206 may be registered with the in-motion proximity guidance system 202. In this example, the in-motion proximity guidance system 202 may additionally or alternatively transmit an alert 218 to notify respective users 220 and 222, and/or a corrective instruction 224 to mobile device(s) 204 and 206. In various examples, the alert may correspond to alert 116 and 118. The corrective instruction 224, however, pertains to scenarios in which the mobile device(s) 204 and 206 are each located within respective moving vehicles, and wherein the mobile device(s) 204 and 206 are communicatively coupled to a collision avoidance system of each respective moving vehicle. In this scenario, the in-motion proximity guidance system 202 may transmit a signal to mobile device(s) 204 and 206 that causes the collision avoidance system of at least one moving vehicle to reduce the vehicle speed by a predetermined amount so as to reduce, if not eliminate a likelihood of a collision.

Figure 3A:
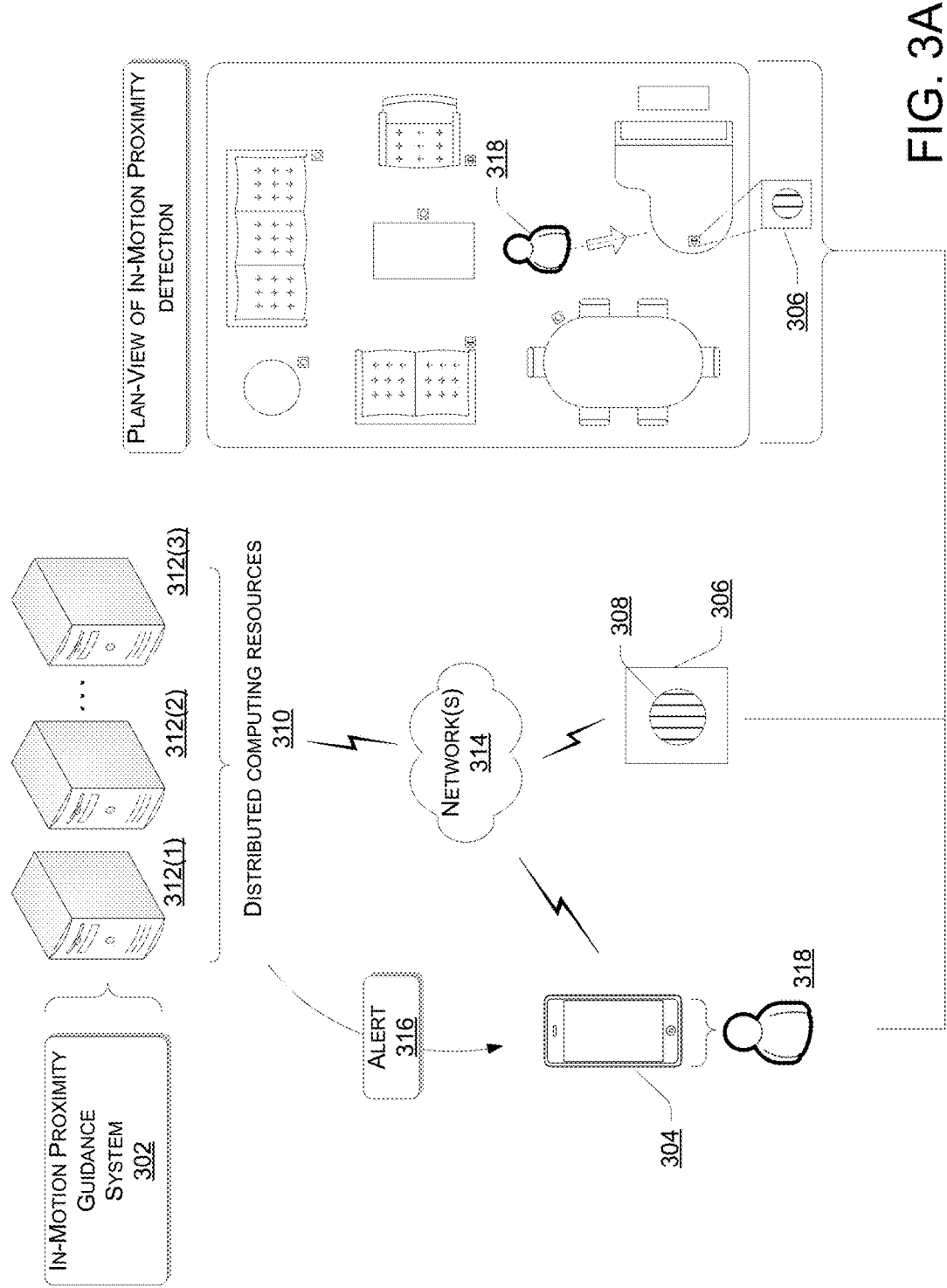
FIG. 3A further illustrates a plan view of an interior room, wherein the in-motion proximity guidance system is being used to detect an imminent collision between a mobile device and a stationary object.

FIG. 3A illustrates a block diagram that shows an example environment in which the in-motion proximity guidance system 302 may detect an imminent collision between a mobile device 304 and at least one stationary object. In a non-limiting example, stationary objects may correspond to household fixtures, such as dining tables, coffee tables, couches, television units, and any other household furniture piece. Thus, unlike detecting a location and a velocity of two in-motion mobile devices, the in-motion proximity guidance system need only detect the location and velocity of one mobile device relative to the location of the stationary object. Such an arrangement may be helpful for visually impaired individuals that are unable to clearly discern a location of household fixtures.

In the illustrated example, the in-motion proximity guidance system 302 may detect a location of a stationary object via a stationary sensor device(s) 306 that is physically coupled to the stationary object. In various examples, the stationary sensor device(s) 306 may include a proximity sensor to detect a relative proximity of objects relative to the stationary object, and a GPS sensor to detect a geographic location of the stationary object. Further, the stationary sensor devices may also include network interfaces to facilitate a communicative connection with the in-motion proximity guidance system 302. The stationary sensor device(s) 306 may further include, or interface with, a visual indicator 308 that can emit different colored lights, such as a 'green light' or 'red light'. The stationary sensor device may further include, or interface with, a speaker to emit an audible sound.

In the illustrated example, the mobile device 304 may correspond to mobile device(s) 104 and 106. Further, the in-motion proximity guidance system 302 may correspond to the in-motion proximity guidance system 102. In various examples, the in-motion proximity guidance system 302 may operate on one or more distributed computing resource(s) 310. The one or more distributed computing resource(s) 310 may correspond to the one or more distributed computing resource(s) 110. In various examples, the distributed computing resource(s) 310 may include one or more computing device(s) 312. The one or more computing device(s) 312 may correspond to the one or more computing device(s) 112.

In various examples, the one or more computing device(s) 312 can include one or more interfaces to enable communications with other networked devices, such as mobile device 304 and the stationary sensor device(s) 306, via one or more network(s) 314. The one or more network(s) may correspond to the one or more network(s) 114.

FIG. 3A further illustrates a plan view of an interior room, wherein the in-motion proximity guidance system is being used to detect an imminent collision between a mobile device and a stationary object. Particularly, stationary sensor device(s) 306 may be physically coupled to stationary objects within the room, and registered with the in-motion proximity guidance system 302. The in-motion proximity guidance system 302 may determine a projected pathway of the mobile device 304 and in doing so, also determine whether the projected pathway is likely to intersect with a location of a stationary object. The in-motion proximity guidance system 302 may receive sensor data from the stationary sensor device(s) 306, via the one or more network(s) 314. For example, proximity sensor data from stationary sensor device(s) 306 may indicate a decreasing relative distance between the stationary object and the mobile device 304. In response to detecting an imminent collision between the mobile device 304 and the stationary object, the in-motion proximity guidance system 302 may transmit an alert 316 to notify the user 318 of the mobile device 304 of the imminent collision. The alert may correspond to alert 116.

Figure 3B:
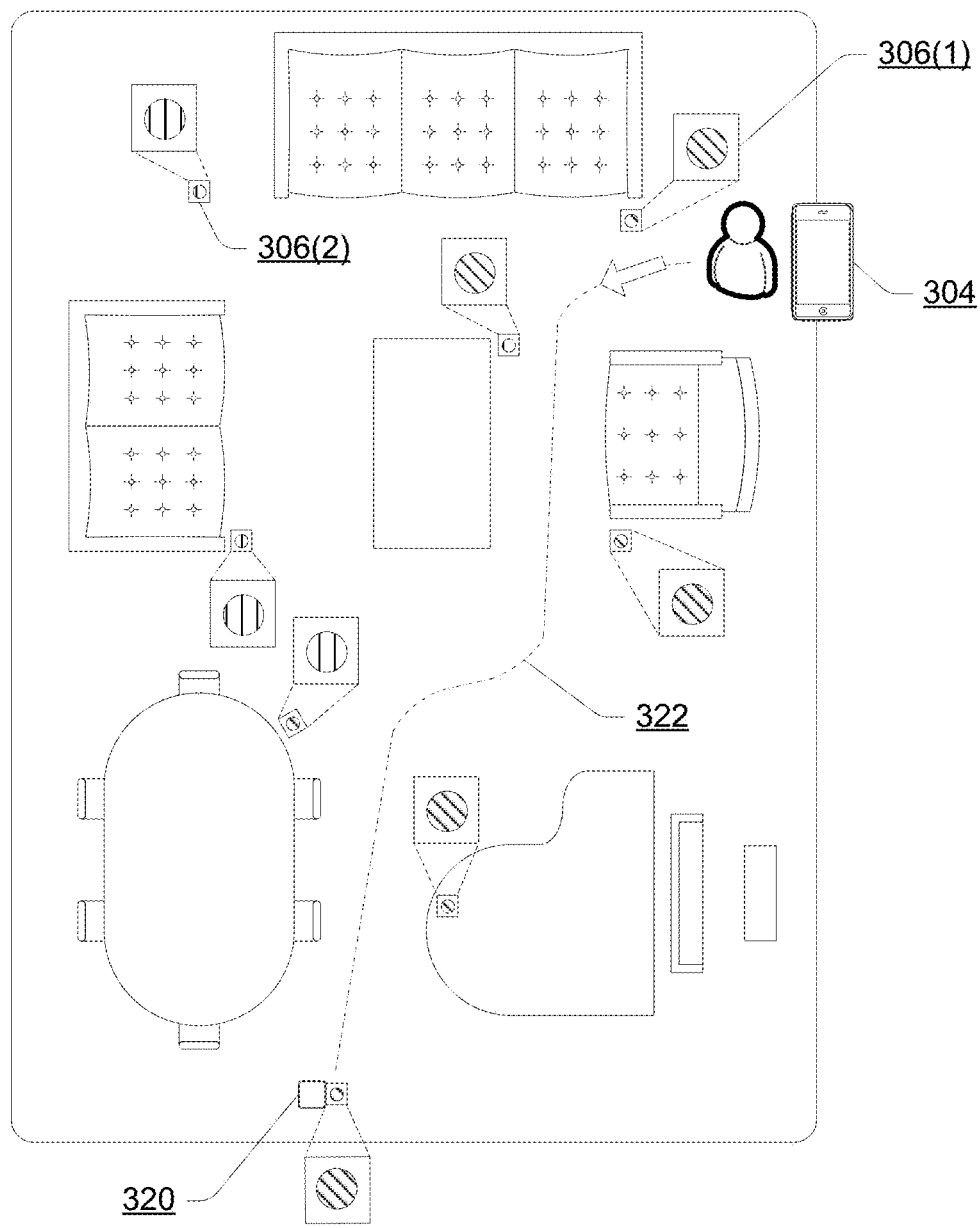
FIG. 3B further illustrates a plan view of an interior room, wherein the in-motion proximity guidance system is used to locate a misplaced item.

FIG. 3B further illustrates a plan view of an interior room, wherein the in-motion proximity guidance system is used to locate a misplaced item 320. For example, the in-motion proximity guidance system 302 may cause the stationary sensor device(s) 306 to emit a visual or audible indication as part of forming a pathway 322 between a location of the mobile device 304 and the misplaced item 320. In some example, the misplaced item 320 may be in a location where a visual and/or audible alert is too far removed from the user 318, and thus cannot capture her attention. In such circumstances, other stationary objects that are located between the location of the mobile device 304 and the location of the misplaced item 320 may be used to provide a visual and/or audible queue that directs the user 318 along a pathway to the misplaced item 320.

In various examples, the in-motion proximity guidance system 302 may detect a first set of stationary objects that are located with a proximity of the pathway 322 between the mobile device 304 and the misplaced item 320. The in-motion proximity guidance system 302 may further cause a visual indicator associated with each of the first set of stationary objects to emit a 'green light' that indicates that the pathway 322 highlighted by the first set of stationary objects is a correct pathway to the misplaced item.

Further, the in-motion proximity guidance system 302 may detect a second set of stationary objects that are not located along the pathway 322 between the mobile device 304 and the misplaced item 320. The in-motion proximity guidance system 302 may further cause a visual indicator associated with each of the second set of stationary objects to emit a 'red light' that indicates that the pathway highlighted by the second set of stationary objects is an incorrect pathway.

Figure 4:
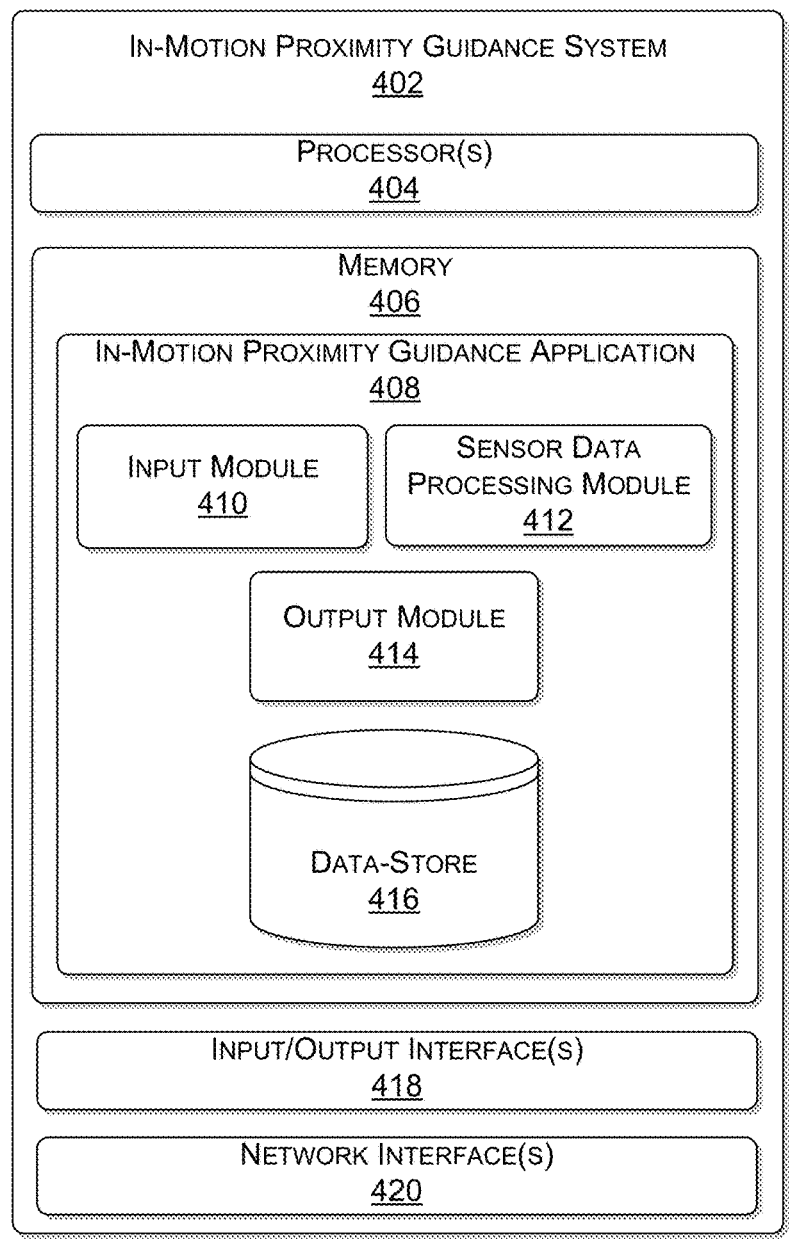
FIG. 4 illustrates a block diagram of an in-motion proximity guidance system 402 that is capable of transmitting an alert and/or corrective action to a mobile device in response to determining a likelihood that a projected path of the mobile device is likely to intersect with a projected path of another mobile device or a location of a stationary object.

FIG. 4 illustrates a block diagram of an in-motion proximity guidance system 402 that is capable of transmitting an alert and/or corrective action to a mobile device in response to determining a likelihood that a projected path of the mobile device is likely to intersect with a projected path of another mobile device or a location of a stationary object. In the illustrated example, the in-motion proximity guidance system 402 may include one or more processor(s) 404 operably connected to memory 406. In at least one example, the one or more processor(s) 404 may be central processing unit(s) (CPU), graphics processing unit(s) (GPU), a both a CPU and GPU, or any other sort of processing unit(s). Each of the one or more processors(s) 404 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 404 may also be responsible for executing all computer applications stored in the memory, which can be associated with common types of volatile (RAM) and/or nonvolatile (ROM) memory.

In some examples, memory 406 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 406 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory may include an in-motion proximity guidance application 408. In various examples, the in-motion proximity guidance application 408 may correspond to the in-motion proximity guidance system 102. The in-motion proximity guidance application 408 may include an input module 410, a sensor data processing module 412, and output module 414, and a data-store 416.

In the illustrated example, the input module 410 receives sensor data from mobile device(s) 104, 106, 204, 206, and 304 or stationary sensor device(s) 306 that is registered within the in-motion proximity guidance system. In some examples, the input module 410 may receive the sensor data directly from the mobile device(s) 104, 106, 204, 206, and 304 or the stationary sensor device(s) 306. With regards to mobile device(s) 104, 106, 204, 206, and 304, the input module 410 may receive sensor data related to mobile device(s) 104, 106, 204, 206, and 304 from other device, including but not limited to smart traffic light camera systems.

In the illustrated example, the sensor data processing module 412 may receive sensor data from the input module 410 that is associated with mobile device(s) 104, 204, and 304 or stationary sensor device(s) 306. In some examples, the sensor data processing module 412 may process sensor data associated with one or more sensor of mobile device(s) 104, 204, and 304 to determine a location and a projected pathway of mobile device(s) 104, 106, 204, 206, and 304 that are in-motion. Further, the sensor data processing module 412 may process sensor data associated with stationary sensor device(s) 306 to determine a location of the stationary sensor device(s) 306.

Further, in response to determining a location and a projected pathway of mobile device(s) 104, 106, 204, 206, and 304, and a location of stationary sensor device(s) 306, the sensor data processing module 412 may further overlay the locations and projected pathways of the mobile device(s) 104, 106, 204, 206, and 304 with the locations of the stationary sensor device(s) 306 to identify combinations of mobile device(s) 104, 106, 204, 206, and 304 and stationary sensor device(s) 306 that are likely to intersect at a given point in time.

In some examples, in response to identifying combinations of mobile device(s) 104, 106, 204, 206, and 304, and stationary sensor device(s) 306 that are likely to intersect at a given point in time, the sensor data processing module 412 may further determine a corrective action that may reduce a likelihood of a collision. In a non-limiting example, the sensor data processing module 412 may determine that a mobile device(s) 104, 106, 204, 206, and 304, is located in a moving vehicle based on a velocity of the mobile device. Further, the sensor data processing module 412 may detect that the mobile device(s) 104, 106, 204, 206, and 304 is communicatively coupled to a collision avoidance system of the moving vehicle. Therefore, a corrective action may involve transmitting a signal to the mobile device(s) 104, 106, 204, 206, and 304 that causes the collision avoidance system of the vehicle to reduce the vehicle speed by a predetermined amount so as to reduce, if not eliminate, a likelihood of a collision. In another non-limiting example, if sensor data related to the mobile device(s) 104, 106, 204, 206, and 304 is received from a smart traffic light camera system, a corrective action may involve altering a sequence of traffic light signals so as to reduce, if not eliminate, a likelihood of the collision.

In the illustrated example, the output module 414 may transmit an alert and/or a corrective action to the combination of mobile device(s) 104, 106, 204, 206, and 304, and stationary sensor device(s) 306 that are likely to intersect at a given point in time.

In the illustrated example, the data-store 416 may store indications of geographic areas in which the in-motion proximity guidance system 402 has identified as a "high risk geographic area." The term "high risk geographic areas," as used herein refers to geographic area where a predetermined number of collision alerts are transmitted to mobile device (s) 104, 106, 204, 206, and 304 within a given time period. In some examples, the output module 414 may transmit an alert to mobile device(s) 104, 106, 204, 206, and 304 that are within a predetermined distance of "high risk geographic areas" as indicated within the data-store 416.

In the illustrated example, the in-motion proximity guidance system further includes input/output interface(s) 418. The input/output interfaces(s) 418 may include any type of output interface known in the art, such as a display (e.g. a liquid crystal display), speakers, a vibrating mechanism, or a tactile feedback mechanism. Input/output interface(s) 418 also include ports for one or more peripheral devices, such as headphones, peripheral speakers, or a peripheral display. Further, the input/output interface(s) 418 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

In the illustrated example, the network interface(s) 420 may include any sort of transceiver known in the art. For example, the network interface(s) 420 may include a radio transceiver that performs the function of transmitting and receiving radio frequency communications via an antenna. The network interface(s) 420 may facilitate wireless connectivity between the mobile device and other electronic devices through a telecommunication network, such as a remote telecommunication server. In addition, the network interface(s) 420 may also include a wireless communication transceiver and a near field antenna for communicating over unlicensed wireless Internet Protocol (IP) networks, such as local wireless data networks and personal area networks (e.g. Bluetooth or near field communication (NFC) networks). Further, the network interface(s) 420 may include wired communication components, such as an Ethernet port or a Universal Serial Bus (USB).

Figure 5:
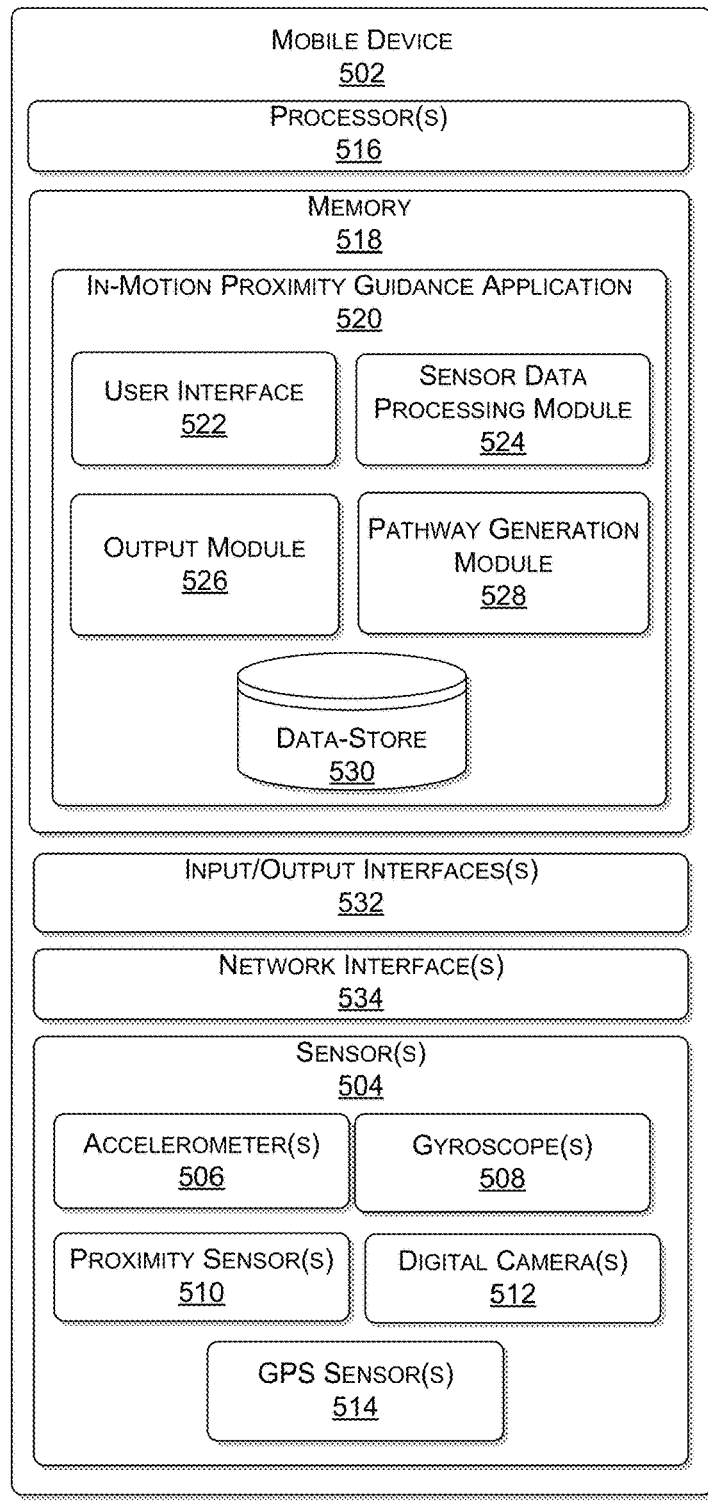
FIG. 5 illustrates a block diagram of a mobile device 502 that includes an in-motion proximity guidance application that interfaces with the in-motion proximity guidance system.

FIG. 5 illustrates a block diagram of a mobile device 502 that includes an in-motion proximity guidance application that interfaces with the in-motion proximity guidance system. In various examples, mobile device 502 corresponds to mobile device(s) 104 and 106. In the illustrated example, the mobile device 502 includes one or more sensor(s) 504 that monitor and receive signal data that corresponds to a movement of the mobile device. In some examples, the one or more sensor(s) 504 may detect and measure movement of the mobile device 502 in any one of the six degrees of freedom. Types of the one or more sensor(s) 504 include, but are not limited to, one or more accelerometer(s) 506, a gyroscope 508, proximity sensor(s) 510, digital camera(s) 512, and a global positioning system (GPS) sensor(s) 514.

In various examples, the mobile device 502 may be configured with one or more accelerometer(s) 506 that measure a movement of the mobile device 502 in at least some of the six translational degrees of freedom. In some examples, the measured translation of the mobile device 502 may be used to determine a velocity of the mobile device 502.

In some examples, a gyroscope 508 can be used to detect an angular position of the mobile device 502. The gyroscope 508 may assist in determining a velocity vector for a projected pathway of the mobile device 502. Further, proximity sensor(s) 510 and digital camera(s) 512 may be used to measure a movement of the mobile device 502 along a particular axis.

The GPS sensor(s) 514 may be used to determine a geolocation of the mobile device 502. In some examples, the GPS sensor(s) 514 may determine a geolocation of the mobile device 502 are predetermined time intervals such that a velocity vector for the mobile device 502 may be generated based on the GPS sensor(s) 514 data.

In the illustrated example, the mobile device 502 may include one or more processor(s) 516 operably connected to memory 518. In various examples, the one or more processor(s) 516 may correspond to the one or more processor(s) 404, and the memory 518 may correspond to the memory 406.

In the illustrated example, the memory 518 may include an in-motion proximity guidance application 520. In various examples, the in-motion proximity guidance application 520 may correspond to the in-motion proximity guidance application 108. The in-motion proximity guidance application 520 may further include a user interface 522, a sensor data processing module 524, an output module 526, and a pathway generation module 528, and a data store 530.

In the illustrated example, the user interface 522 may display a visual alert indication that is received from the output module 414 or 526. Further, the user interface 522 may also receive a request to located a misplaced item. In various example, the misplaced item includes a stationary sensor device(s) 306 such that the location of the misplaced item can be located by the in-motion proximity guidance system.

In the illustrated example, the sensor data processing module 524 may correspond to the sensor data processing module 412. That is, the sensor data from the one or more sensor(s) 504 may be processed within the mobile device 502, or alternatively, may be processed remotely by the in-motion proximity guidance system 402.

In the illustrated example, the output module 526 may correspond to the output module 414 in response to the sensor data being processed by the sensor data processing module 524.

In the illustrated example, the pathway generation module 528 may receive may receive an indication via the user interface 522, that a particular item has been misplaced. In various examples, the pathway generation module 528 may determine a location of the particular item, based at least in part on sensor data received from the stationary sensor device(s) 306 physically coupled to the particular item. Further, the pathway generation module 528 may a pathway may represent a shortest distance between the mobile device(s) 104, 204, and 304, and the particular item.

Further, the pathway generation module 528 may detect a first set of stationary objects that are located within a proximity of the pathway between the mobile device(s) 104, 106, 204, 206, and 304 and the particular item. The purpose of detecting the first set of stationary objects is to provide a visual and/or audible indicator that alerts the user that the first set of stationary objects are located along a pathway to the particular item. In some examples, the visual indicator associated with the first set of stationary objects may be a 'green colored' light, and the audible indicator may be any audible sound that indicates that the pathway highlighted by the first set of stationary objects is a correct pathway.

In some examples, the pathway generation module 528 may also detect a second set of stationary objects that are not located along the pathway between the mobile device(s) 104, 106, 204, 26, and 304 and the particular item. The purpose of detecting the second set of stationary objects is to provide a visual and/or audible indicator that alerts the user that the second set of stationary objects are not located along a pathway to the particular item. In some examples, the visual indicator associated with the second set of stationary objects may be a 'red colored' light, and the audible indicator may be any audible sound that indicates that the pathway highlighted by the second set of stationary objects is an incorrect pathway.

In the illustrated example, the data store 530 may correspond to the data-store 416 in response to the sensor data being processed by the sensor data processing module 524.

In the illustrated example, the mobile device 502 may include input/output interface(s) 532. In various examples, the input/output interface(s) 532 may correspond to the input/output interface(s) 418. Further the input/output interface(s) 532 may further include an interface with a collision avoidance system of a vehicle that is communicatively coupled to the mobile device 502. In various examples, the vehicle may be communicatively coupled to the mobile device via the network interface(s) 534.

In the illustrated example, the mobile device 502 may include network interface(s) 534. In various examples, the network interface(s) 534 may correspond to the network interface(s) 420.

Figure 6:
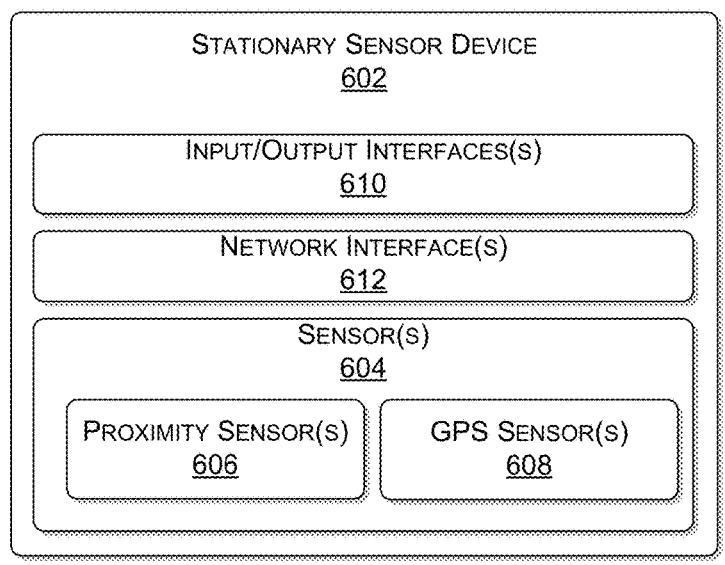
FIG. 6 illustrates a block diagram of a stationary sensor device 602 that is physically coupled to stationary objects.

FIG. 6 illustrates a block diagram of a stationary sensor device 602 that is physically coupled to stationary objects, and registered with the in-motion proximity guidance system. In a non-limiting example, stationary objects may correspond to fixtures, such as dining tables, coffee tables, couches, television units, and any other household furniture piece.

In the illustrated example, the stationary sensor device 602 may include one or more sensor(s) 604. The one or more sensor(s) 604 may include proximity sensor(s) 606 to measure a relative distance of mobile device(s) 104, 106, 204, 206, 304, and 502 to the stationary object. The proximity sensor(s) 606 may correspond to proximity sensor(s) 510. Further, the one or more sensor(s) 604 may include GPS sensor(s) 608 to determine a location of the stationary object. The GPS sensor(s) 608 may correspond to GPS sensor(s) 514.

In the illustrated example, the stationary sensor device 602 may include input/output interface(s) 610. The input/output interface(s) 610 may correspond to input/output interface(s) 418 and 532. Further, the input/output interface(s) 610 may include an interface with a visual indicator such as a 'green colored' light and a 'red colored light' and a speaker that is capable of emitting an audible alert signal.

In the illustrated example, the stationary sensor device 602 may include network interface(s) 612 to interface with at least one of the in-motion proximity guidance system 402 or the mobile device 502. The network interface(s) 612 may correspond to network interface(s) 420 or 534.

Figure 7:
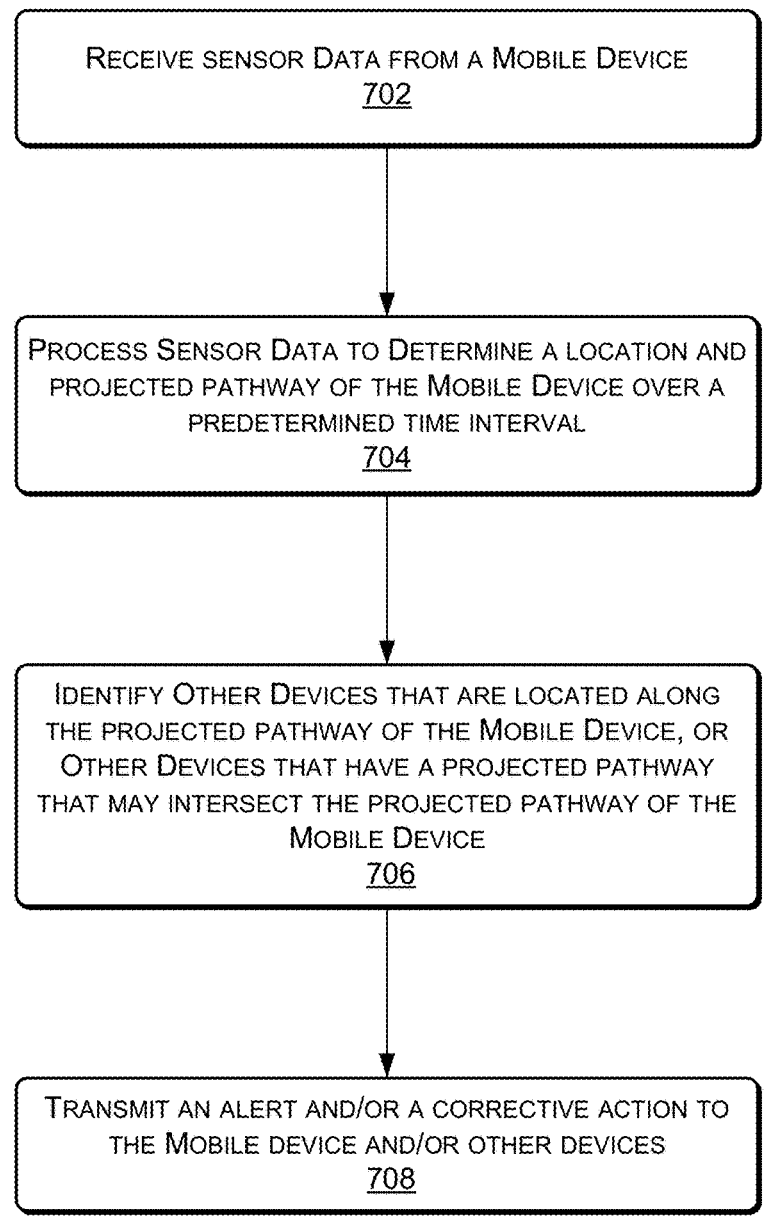
FIG. 7 illustrates a flow diagram of a process for transmitting an alert and/or corrective action to a mobile device in response to determining a likelihood that the path of the mobile device is likely to intersect with and at least one other mobile device and/or object.

FIG. 7 illustrates a flow diagram of a process for transmitting an alert and/or corrective action to a mobile device in response to determining a likelihood that a projected path of the mobile device is likely to intersect with another mobile device or stationary object. In various examples, the mobile device may be associated with a user, and thus a motion of the user may represent the motion of the mobile device. Sensors coupled to the mobile device may detect a motion of a user that is consistent with various forms of physical activity, such as walking, running, or cycling.

At 702, the in-motion proximity guidance system may receive sensor data from a mobile device. The sensor data may correspond to data received from one or more sensors that include at least one of an accelerometer, proximity sensor, gyroscope, barometer, and GPS sensor.

At 704, the in-motion proximity guidance system may process the sensor data to determine a location of the mobile device and a projected pathway of the mobile device over a predetermined time interval. In various examples, the sensor data of one or more sensor types can be combined to determine the location and projected pathway of the mobile device. For example, sensor data associated with an accelerometer can be combined with GPS sensor data to determine a velocity of the mobile device. Further, the projected pathway of the mobile device can be determined by using processed sensor data associated with the velocity and location of the mobile device. Moreover, the predetermined time interval may be based on the velocity of the mobile device. For example, the in-motion proximity guidance system may select a predetermined time interval that would allow the mobile device to reduce its current velocity to a complete stop from its current velocity. In one non-limiting example, the predetermined time interval for a mobile device travelling at 15 mph may be greater than a predetermined time interval for mobile device travelling at 10 mph. In both cases, the in-motion proximity guidance system may determine that a type of motion of the mobile device is consistent with cycling, and thus may determine that a greater predetermined time interval is required to stop from a velocity of 15 mph as compared to a velocity of 10 mph. In another non-limiting example, the in-motion proximity guidance system may detect that the mobile device is travelling at a velocity of 40 mph, and thus determine that a type of motion of the mobile device is consistent with travelling in a vehicle. Thus, the predetermined time interval may be based on the time required for a vehicle coming to a complete stop from 40 mph.

At 706, the in-motion proximity guidance system may identify other devices that are located along the projected pathway of the mobile device, or any other mobile device that have a projected pathway that may intersected with the projected pathway of the mobile device. In a non-limiting example, multiple users may register their mobile devices with the in-motion proximity guidance system. In doing so, the in-motion proximity guidance system may receive and process sensor data from each registered mobile device, and thus may access and determine, in real-time, a location and projected pathway of each registered mobile device. In a non-limiting example, the in-motion proximity guidance system may overlay projected pathways of various mobile devices to identify combinations of mobile devices that are likely to intersect at any given point in time.

At 708, the in-motion proximity guidance system may transmit an alert and/or corrective action to the mobile device and/or other devices. In a first non-limiting example, the in-motion proximity guidance system may detect that the projected pathways of two mobile devices are likely to intersect at a given point in time. In doing so, the in-motion proximity guidance system may transmit a signal to each mobile device that causes an activation of an alert that indicates an imminent collision. The alert may correspond to a visual indication that appears on a user interface of the mobile device. Alternatively, or additionally, the alert correspond to an audible alert that can be transmitted through a speaker of the mobile device, or a haptic alert that can be transmitted through a vibration of the mobile device.

In a second non-limiting example, the in-motion proximity guidance system may also transmit a corrective action to avoid an imminent collision. For example, in-motion proximity guidance system may determine that the mobile device is travelling within a vehicle, based on the velocity of the mobile device. Further, the in-motion proximity guidance system may further detect that the mobile device is communicatively coupled to collision avoidance system that is associated with the vehicle. Thus, a corrective action may correspond to transmitting a signal to the collision avoidance system that causes the vehicle to reduce its current speed by a sufficient amount such that a likelihood of an imminent collision with another mobile device is reduced, if not eliminated.

Figure 8:
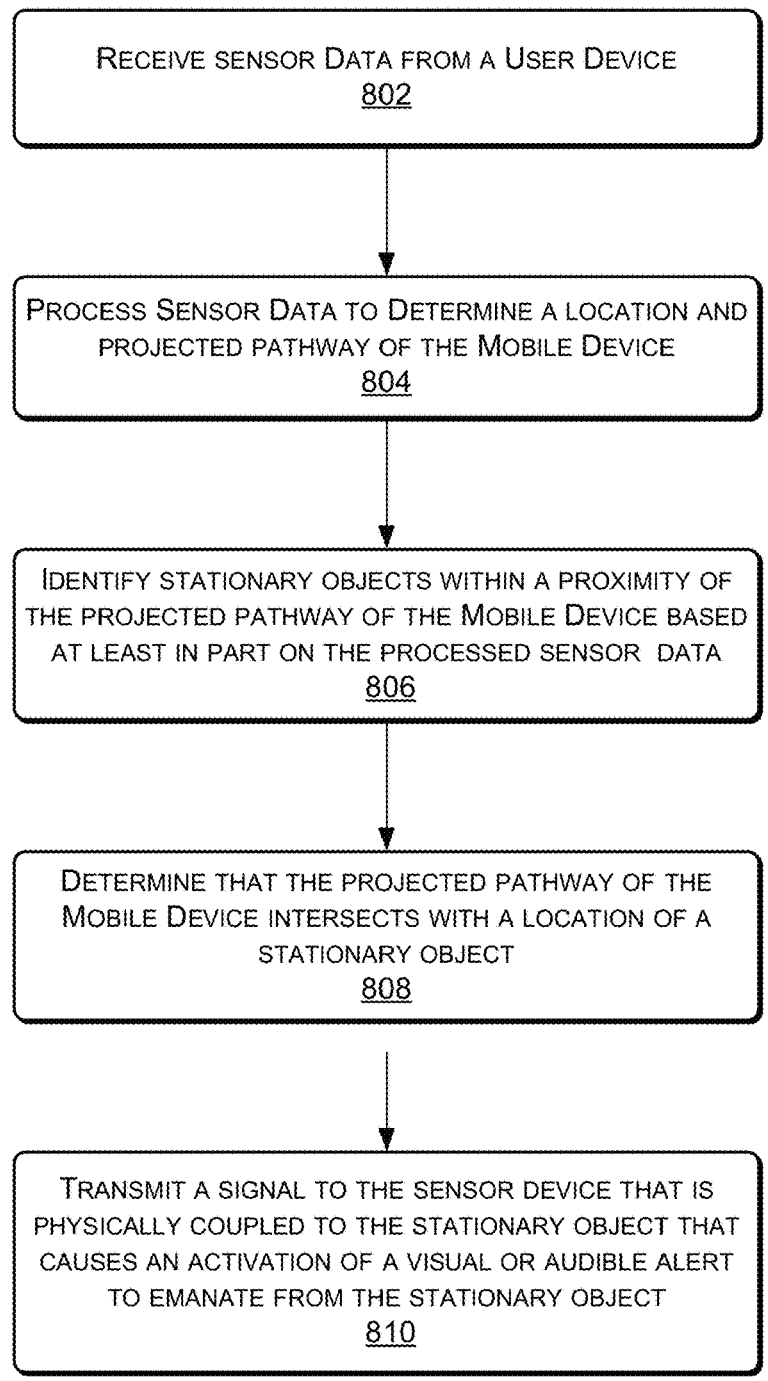
FIG. 8 illustrates a flow diagram of a process for transmitting an alert in response to determining a likelihood that the path of the mobile device is likely to intersect with a stationary object.

FIG. 8 illustrates a flow diagram of a process for transmitting an alert in response to determining a likelihood that the path of the mobile device is likely to intersect with a stationary object. In various examples, stationary sensor devices may be physically coupled to stationary objects, and registered with the in-motion proximity guidance system. In a non-limiting example, stationary objects may correspond to household fixtures, such as tables, coffee tables, couches, television units, and any other household furniture piece. Thus, unlike detecting a location and a velocity of two in-motion mobile devices, the in-motion proximity guidance system need only detect the location and velocity of a mobile device relative to the location of the stationary object. Such an arrangement may be helpful for visually impaired individuals that are unable to clearly discern a location of household fixtures.

In various examples, the stationary sensor devices may include a proximity sensor to detect a relative proximity of objects relative to the stationary object, and a GPS sensor to detect a geographic location of the stationary object. Further, the stationary sensor devices may also include network interfaces to facilitate a communicative connection with the in-motion proximity guidance system.

At 802, the in-motion proximity guidance system may receive sensor data from a mobile device. The sensor data may correspond to data received from one or more sensors that include at least one of an accelerometer, proximity sensor, gyroscope, barometer, and GPS sensor.

At 804, the in-motion proximity guidance system may process the sensor data to determine a location of the mobile device and a projected pathway of the mobile device over a predetermined time interval. Alternatively, the sensor data may be processed by the mobile device and transmitted to the in-motion proximity guidance system as processed sensor data.

At 806, the in-motion proximity guidance system may identify one or more stationary objects that are within a proximity of the projected pathway of the mobile device based at least in part on the processed sensor data. In various examples, the in-motion proximity guidance system may also receive sensor data from stationary objects. For example, proximity sensor data from a stationary sensor device that is physically coupled to a stationary object may indicate a relative distance between the stationary object and the mobile device.

At 808, the in-motion proximity guidance system may determine that the projected pathway of the mobile device is likely to intersect with the location of the stationary object. In various example, the determination may be based on a combination of the processed sensor data from the mobile device and the sensor data from the stationary sensor device that is physically coupled to the stationary object.

At 810, in response to detecting an imminent collision between the mobile device and the stationary object, the in-motion proximity guidance system may transmit a signal to the stationary sensor device that is physically coupled to the stationary object. The signal may cause an activation of at least one of a visual alert or an audible alert from the stationary sensor device. The visual alert may correspond to a 'colored' light that emanates from the stationary object. Further, the audible alert may correspond to an audible sound that is likely to capture the attention of a person approaching the stationary object.

Figure 9:
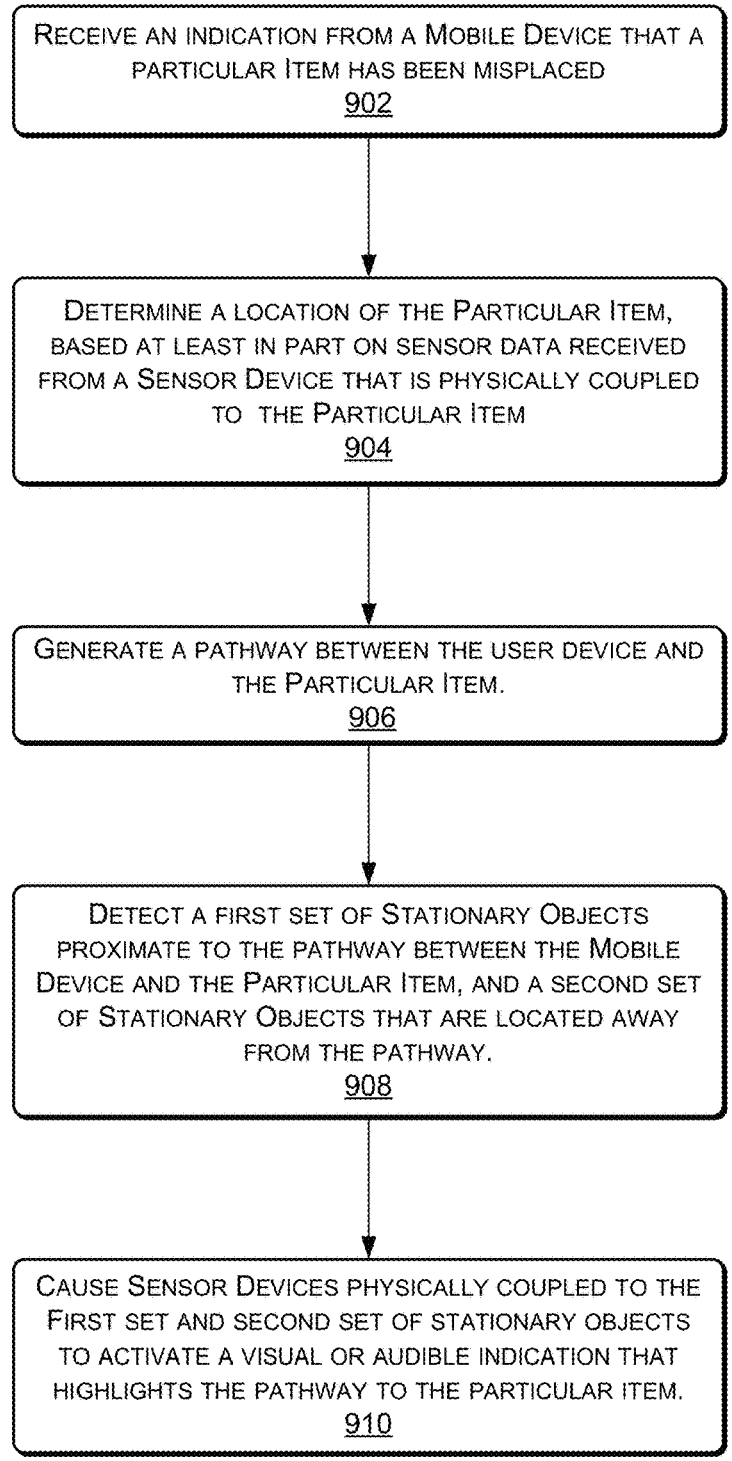
FIG. 9 illustrates a flow diagram of a process for causing one or more stationary objects to emit a visual or audible indication as part of forming a pathway between a location of a mobile device and a location of a particular item.

FIG. 9 illustrates a flow diagram of a process for causing one or more stationary objects to emit a visual or audible indication as part of forming a pathway between a location of a mobile device and a location of a particular item. In some example, a user of the mobile device may misplace a particular item in a location where a visual and/or audible alert emitted from the particular item may not capture the user's attention. In such circumstances, other stationary objects that are located between the location of the mobile device and the location of the particular item may be used to provide a visual and/or audible queue that directs the user along a pathway to the particular item.

At 902, the in-motion proximity guidance system may receive an indication via a user interface of a mobile device, that a user has misplaced a particular item. In various examples, the particular item is registered with the in-motion proximity guidance system. Further, the particular item may be physically coupled to stationary sensor devices, such that the in-motion proximity guidance system is able to determine a current location of the particular item via sensor data received from the stationary sensor devices.

At 904, the in-motion proximity guidance system may determine a location of the particular item, based at least in part on sensor data received from the stationary sensor devices associated with the particular item. For example, GPS sensor data from a stationary sensor device physically coupled to the particular item may indicate a current location of the particular item.

At 906, the in-motion proximity guidance system may generate a pathway between the mobile device and the particular item. In various examples, the pathway may represent a shortest distance between the mobile device and the particular item.

At 908, the in-motion proximity guidance system may detect a first set of stationary objects that are located within a proximity of the pathway between the mobile device and the particular item. The purpose of detecting the first set of stationary objects is to provide a visual and/or audible indicator that alerts the user that the first set of stationary objects are located along a pathway to the particular item. In some examples, the visual indicator associated with the first set of stationary objects may be a 'green colored' light, and the audible indicator may be any audible sound that indicates that the pathway highlighted by the first set of stationary objects is a correct pathway.

In some examples, the in-motion proximity guidance system may also detect a second set of stationary objects that are not located along the pathway between the mobile device and the particular item. The purpose of detecting the second set of stationary objects is to provide a visual and/or audible indicator that alerts the user that the second set of stationary objects are not located along a pathway to the particular item. In some examples, the visual indicator associated with the second set of stationary objects may be a 'red colored' light, and the audible indicator may be any audible sound that indicates that the pathway highlighted by the second set of stationary objects is an incorrect pathway.

At 910, the in-motion proximity guidance system may transmit a signal to stationary sensor devices that are physically coupled to the first set of stationary objects and/or the second set of stationary objects. The signal may cause the respective stationary sensor devices to activate a visual and/or audible indication that highlights the correct and incorrect pathways from the initial location of the mobile device to the misplaced location of the particular item.

In a non-limiting example, the in-motion proximity guidance system may transmit to a signal to each stationary sensor device of individual stationary objects based on a proximity of the mobile device to the individual stationary objects. A proximity of the mobile device to the individual stationary objects may be determined by sensor data received from proximity sensors coupled to each stationary sensor device of the individual stationary objects. For example, in response to determining that the mobile device is within a predetermined distance of a stationary object of the first set of stationary objects, the in-motion proximity guidance system may cause an activation of a 'green colored' light on the stationary object. In this example, the 'green colored' light indicates a correct pathway to the misplaced location of the particular item.

Alternatively, or additionally, in response to determining that the mobile device is within a predetermined distance of a stationary object of the second set of stationary objects, the in-motion proximity guidance system may cause an activation of a 'red colored' light on the stationary object. In this example, the 'red colored' light indicates an incorrect pathway to the misplaced location of the particular item.

CONCLUSION

Although the subject matter has been described in language specific to features and/methodological acts, it is to be understood that the subject matter defined in the appended claims is not necessarily limited to the specific features or acts described herein. Rather, the specific features and acts are disclosed as exemplary forms of implementing the claims.

What is claimed:

1. A system, comprising:
one or more processors;
memory coupled to the one or more processors, the memory including one or more modules that are executable by the one or more processors to:
receive a first set of sensor data associated with a first device, the first set of sensor data indicating, at a first point in time, a first location and a velocity of the first device;
process the first set of sensor data to determine a first projected pathway of the first device that is likely to occur over a predetermined time interval;
receive a second set of sensor data associated with a second device, the second set of sensor data indicating, at the first point in time, a second location of the second device;
determine that at a second point in time, a distance between the first device and the second device is likely to be below a predetermined distance threshold, based at least in part on the first location, the first projected pathway and the second location; and
transmit a data packet to the first device, the data packet including an indication that at the second point in time, the distance between the first device and the second device is likely to be below the predetermined distance threshold.

2. The system as recited in claim 1, wherein the second set of sensor data further indicates a velocity of the second device, and wherein the one or more modules are further executable by the one or more processors to:

process the second set of sensor data to determine a second projected pathway of the second device that is likely to occur over the predetermined time interval, and wherein to determine that at the second point in time, the distance between the first device and the second device is likely to be below a predetermined distance threshold, is further based at least in part on the second projected pathway.

3. The system as recited in claim 2, wherein the indication transmitted to the first device is a first indication, and wherein the one or more modules are further executable by the one or more processors to:

transmit, to the second device, a second indication that at the second point in time, the distance between the first device and the second device is likely to be below the predetermined distance threshold.

4. The system as recited in claim 1, wherein the first set of sensor data is received from a first set of sensors associated the first device, and the second set of sensor data is received from a set of sensors associated with the second device.

5. The system as recited in claim 1, wherein the first set of sensor data and the second set of sensor data is received from a smart traffic light, and wherein the one or more modules are further executable by the one or more processors to:

transmit a signal to the smart traffic light, the signal indicating an altered sequence of stop and go indications that is sufficient to reduce a likelihood that, at the second point in time, the distance between the first device and the second device is to be below the predetermined distance threshold.

6. The system as recited in claim 1, wherein the predetermined time interval is based at least in part on the velocity of the first device.

7. A mobile device, comprising:

one or more sensors that detect a movement of the mobile device;

one or more processors coupled to the one or more sensors;

memory coupled to the one or more processors, the memory including one or more modules that are executable by the one or more processors to:

receive, from the one or more sensors, sensor data indicating a location and a velocity of the mobile device;

process the sensor data, the sensor data to indicate a projected pathway of the mobile device that is likely to occur over a predetermined time interval;

transmit, to a server, the sensor data; and receive, from the server, a data packet that includes an alert indicating that at a second point in time, a distance between the mobile device and an additional device is likely to be below a predetermined distance threshold.

8. The mobile device as recited in claim 7, wherein the alert comprises at least one of a visual alert that displays on a user interface of the mobile device, an audible alert that is transmitted via a speaker of the mobile device, or a haptic alert that is transmitted through a vibration of the mobile device.

9. The mobile device as recited in claim 7, wherein the additional device is physically coupled to an item, and wherein the one or more modules are further executable by the one or more processors to:

transmit, via a user interface of the mobile device and to the server, a request to locate the item, and wherein to receive, from the server, the data packet that includes the alert is based at least in part on the request.

10. The mobile device as recited in claim 7, wherein the additional device is physically coupled to a fixture, and wherein the one or more modules are further executable by the one or more processors to:

transmit, to the additional device, a signal that causes an activation of at least one of a visual alert on the additional device or an audible alert on the additional device, the visual alert and the audible alert identifying a location of the fixture.

11. The mobile device as recited in claim 7, wherein to receive the sensor data indicating the location and the velocity of the mobile device is based at least in part on a detection of a user interaction with a user interface of the mobile device, or a determination that the velocity of the mobile device is greater than a predetermined velocity threshold.

12. The mobile device as recited in claim 7, wherein the one or more sensors include at least one of an accelerometer, a gyroscope, a barometer, a proximity sensor, a digital camera, and a global position system (GPS) sensor.

13. One or more non-transitory computer-readable media storing computer-executable instructions, that when executed on one or more processors, cause the one or more processors to perform acts comprising:

receiving sensor data from one or more sensors associated with a first device;

determining a first location of the first device, based at least in part on the sensor data;

identifying, a second device based at least in part on a second location of the second device being within a predetermined distance of the first device;

receiving, via a user interface of the first device, a first indication that a user associated with the first device is searching for a third device that is located within a predetermined distance of the first device;

determining a third location of the third device based at least in part on receipt of a second indication from the third device;

determining that the second location of the second device is located between the first location of the first device and the third location of the third device; and transmitting a signal to the first device, based at least in part on the second device being located with the predetermined distance of the first device, wherein transmitting the signal causes an activation of at least one of a visual indicator or an audible indicator that alerts the user that the second device is located along a pathway to the third device.

14. The one or more non-transitory computer-readable media as recited in claim 13, wherein the second device is physically coupled to a fixture.

15. The one or more non-transitory computer-readable media as recited in claim 13, wherein the second device includes at least one of a visual indicator or an audible indicator, and wherein transmitting the signal causes an activation of at least one of the visual indicator or the audible indicator that identifies the second location of the second device.

16. The one or more non-transitory computer-readable media as recited in claim 13, wherein:

receiving the first indication comprises receiving an indication that the user associated with the first device is searching for a particular item that is located within a predetermined distance of the first device, the particular item being physically coupled to a third device; and determining third location comprises determining a location of the particular item based at least in part on receipt of the second indication from the third device.

* * * * *